No. 784,340. PATENTED MAR. 7, 1905.
B. F. MAYO.
HEEL TRIMMING MACHINE.
APPLICATION FILED APR. 6, 1901.
3 SHEETS—SHEET 2.
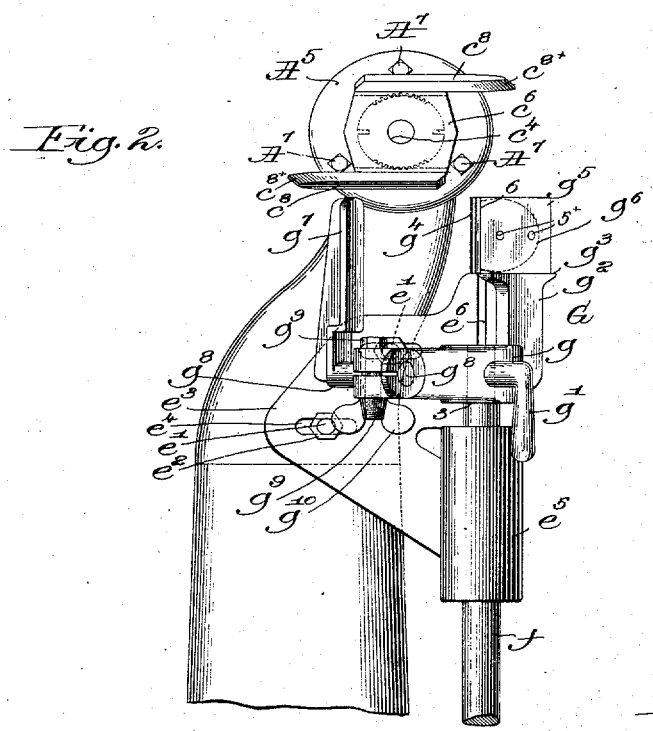
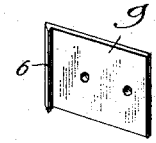
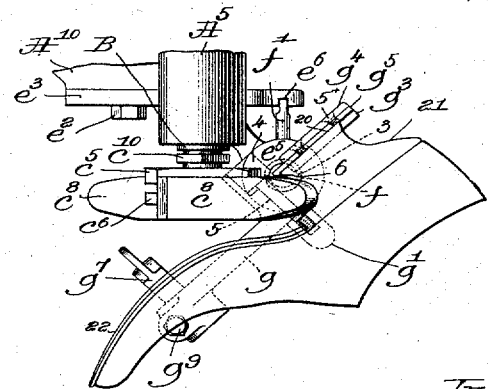

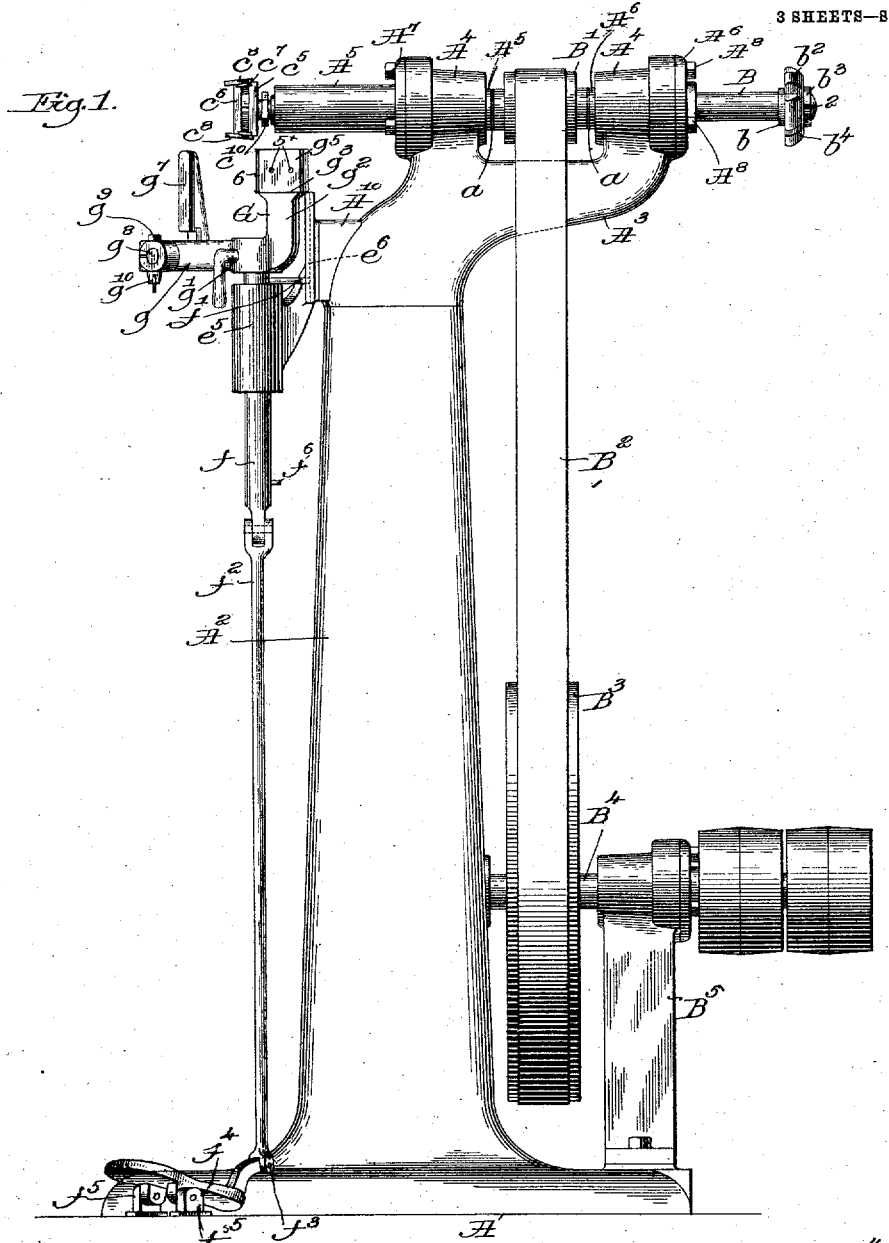

No. 784,340. PATENTED MAR. 7, 1905.
B. F. MAYO.
HEEL TRIMMING MACHINE.
APPLICATION FILED APR. 6, 1901.
3 SHEETS—SHEET 3.
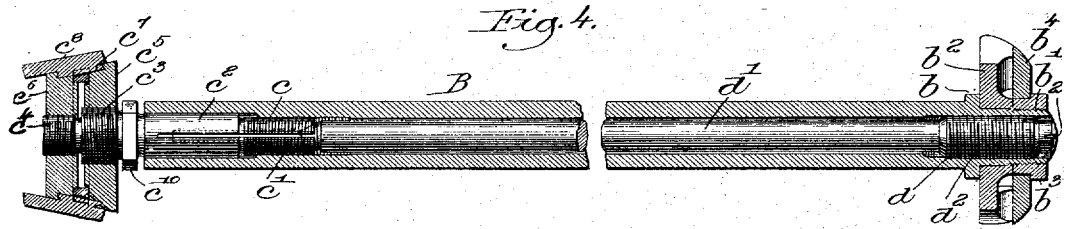
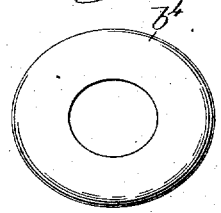
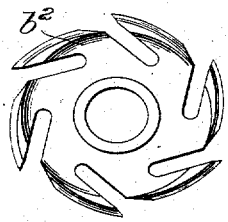
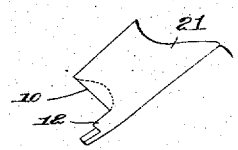
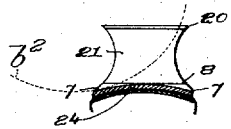
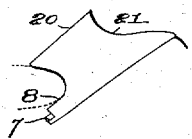
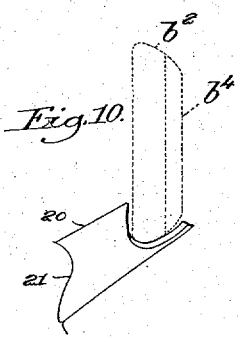
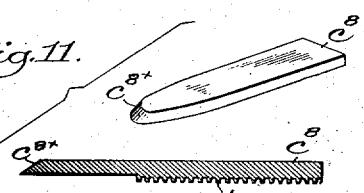
Witnesses:
Fred S. Greenleaf
Adolf E. Kaiser
Inventor.
Benjamin F. Mayo.
by Crosby & Gregory
attys.

No. 784,340. Patented March 7, 1905.

UNITED STATES PATENT OFFICE.

BENJAMIN F. MAYO, OF SALEM, MASSACHUSETTS, ASSIGNOR TO UNITED SHOE MACHINERY COMPANY, OF BOSTON, MASSACHUSETTS, A CORPORATION OF NEW JERSEY.

HEEL-TRIMMING MACHINE.

SPECIFICATION forming part of Letters Patent No. 784,340, dated March 7, 1905.

Application filed April 6, 1901. Serial No. 54,690.

*To all whom it may concern:*

Be it known that I, BENJAMIN F. MAYO, a citizen of the United States, residing at Salem, in the county of Essex and State of Massachusetts, have invented an Improvement in Heel-Trimming Machines, of which the following description, in connection with the accompanying drawings, is a specification, like characters on the drawings representing like parts.

This invention has for its object the production of a novel machine for trimming and concaving the breasts of heels.

The machine herein to be described, which illustrates my invention in one simple form, the best now known to me, contains a shaft provided in this instance of my invention with a primary and a secondary rotary cutter, one following the other in concaving the breast of the heel. The primary cutter presents blades shaped to cut in the breast of the heel a concave extending substantially from the breast edge of the top lift of the heel to the highest point of the shank of the shoe-sole without injuring the shank, and the secondary cutter acts to trim from the breast of the heel portions of said breast adjacent to said shank between the side edges and the central or highest part of the shank, which portions were not removed by the primary cutter. While the primary cutter is doing its work the shoe is held on a jack under the control of the operator, said jack having provision for supporting the shoe with the face of the top lift and the breast of the heel in acute-angular position with relation to the longitudinal axis of the cutter-carrying shaft, thus enabling the heel-breast to be properly presented for the operation of the cutter in concaving the breast of the heel. Said jack is movable to present the shoe to the cutter, its movement being controlled by suitable guides. The jack carries a support for the tread of the heel, and on this support is a device for positioning the breast edge of the top lift. To enable the concave formed in the breast of the heel to be varied in shape and depth without changing the cutter I have so mounted the jack that it may be turned about a center located substantially in the line of travel of the edge of the blades of the cutter and in the line of the breast edge of the top lift when a shoe is in position on the jack, so that when the jack is rotated the position of the breast edge of the top lift relatively to the cutter will not be changed. Thus by a slight rotation of said jack the depth of the cut which is made in the breast of the heel may be varied without varying the cut adjacent to the breast of the top lift.

The device herein shown for positioning the breast edge of the top lift consists of a lip on the support for the tread-face of the heel. The acting face of this lip stands always in line with the axis of rotation of the jack and also immediately adjacent to the path of the blades of the cutter, so that when the jack is rotated to vary the depth of the cut made in the breast of the heel the position of the lip with relation to the cutter is unchanged.

The secondary cutter has combined with it a guard to engage the shank of the sole of the shoe while that cutter is operating, the purpose of said guard being to obviate cutting into and marring said shank and also determining the depth of the cut made by the secondary cutter.

Figure 1, in front elevation, represents a machine embodying my invention. Fig. 2 is an enlarged detail of a part of the left-hand end of the machine. Fig. 3 is a partial top or plan view showing the primary cutter with a shoe and heel in position, the cutter having completed its cutting action. Fig. $3^a$ is a detail showing the plate $g^5$, constituting one form of heel positioning or alining device, detached. Fig. 4 is an enlarged sectional detail showing the shaft with its two cutters. Fig. 5 shows a face view of the secondary cutter. Fig. 6 is a face view of the guard coöperating with said cutter. Fig. 7 is a detail view showing part of a sole of a shoe with a heel attached thereto and in dotted lines the portion of the breast of the heel which is to be removed by the primary cutter. Fig. 8 shows a heel having its breast concaved by the primary cutter, part of said cutter being represented therein by dotted lines. Fig. 9 is a view of the breast of the heel shown in Fig. 8, illustrating the condition in which the primary cutter leaves the breast of the heel, the dotted circle in said figure showing the position of the secondary cutter in operating to remove portions of the breast of the heel adjacent to the sole of the shoe between the side edges and the central part of the shank of said sole. Fig. 10 represents a heel with the secondary cutter in working position. Fig. 11 shows a blade of the primary cutter in perspective and in longitudinal section.

Referring to the drawings, A represents a suitable base, upon which is erected a column $A^2$, having at its upper end a head $A^3$, having suitable hubs $A^4$, which receive bearings $A^5$ and $A^6$, the bearing $A^5$ being held in place by bolts $A^7$, while the bearing $A^6$ is held in place by bolts $A^8$, the inner ends of said bearings being represented as extended through the hubs $A^4$ and receiving a tubular shaft B, having fixed to it a pulley B', the smaller reduced ends of which meet substantially the inner ends of the bearings. I preferably interpose between the hubs of said pulley and the ends of said bearings an antifriction-washer $a$, which may be made of fiber or other usual material. The pulley B' receives about it a belt $B^2$, surrounding and driven by a larger pulley $B^3$, fast on the power-shaft $B^4$, sustained in said column and in an upright $B^5$, said shaft having usual fast and loose pulleys to receive a belt in usual manner.

The shaft B has at its right-hand end a collar $b$ at a short distance from the outer end thereof, a part of the shaft beyond said collar being provided with a screw-thread $b'$, the unthreaded part of said shaft beyond said collar receiving upon it the secondary cutter $b^2$. (Shown in section at the right in Fig. 4 and in face view in Fig. 5.) Said cutter is confined in position on said shaft by means of a shouldered nut $b^3$ applied to the threaded end of the shaft, (see Fig. 4,) said nut when applied to the shaft to hold the cutter $b^2$ in working position entering and sustaining in working position the guard $b^4$, the acting face of which forms an angle with the acting face of the cutter, so that the guard will engage the shank of the sole of the shoe while the cutter trims from the breast of the heel portions of said breast adjacent to said shank between the side edges and the central part of said shank. The guard $b^4$ in this instance of my invention is preferably mounted on the nut, so that when the guard contacts with the shoe it may remain substantially at rest, while the shaft continues to rotate, thus obviating marring the shoe-sole, as it might do should the guard rotate in unison with the secondary cutter. This construction is not, however, essential and should the guard be fixed and rotate with the cutter that construction would be within the scope of this invention.

The hollow shaft B is provided at two points with internal screw-threads, as at $c$ and $d$, the threads $c$ receiving the threaded end $c'$ of a short split shaft $c^2$, provided at its outer or left-hand end (see Fig. 4) with two screw-threaded portions $c^3$ and $c^4$, the threads cut on the portions $c^3$ and $c^4$ being one right and the other left hand, said threads being herein represented as made on parts of said shaft of different diameter, the part $c^3$ receiving upon it one half, $c^5$, of the cutter-head, the other half, $c^6$, of the cutter-head being threaded to engage the screw-threads $c^4$, this construction being well known and forming no part of my invention. Each of these parts of the cutter-head in this present instance of my invention is provided with one-half of dovetail grooves adapted to receive the dovetail shanks $c^7$ of suitable cutter-blades $c^8$, two such blades being herein represented, each blade having teeth $t$ of usual construction to provide for adjustment, said head and blades constituting a preferred form of primary cutter. Viewing Fig. 11, which shows one of said cutter-blades enlarged in perspective and in section, it will be seen that the edge of the cutter is rounded to correspond with the general outline required for the concave to be cut in the breast of the heel, and it will be noticed that the back-off $c^{8\times}$ of the cutter runs from its cutting edge backwardly toward the upper side of the cutter, viewing the same in the direction of its rotation.

Heretofore cutters used in trimming heels have been ground to resharpen them by grinding that face of the cutter which leads in the rotation thereof, (the under side viewing Fig. 11;) but such grinding of a cutter of the shape herein shown would lessen the circle occupied by the cutting edge, so that after it has been ground the cutter could not cut a concave in the breast of the heel of the same size that it was adapted to cut before it was ground. In order that the blades herein represented as employed in the primary cutter may always cut a uniform groove in all conditions of use after grinding, I sharpen the cutters by grinding against the back-off $c^{8\times}$, such method of grinding obviating any liability of changing the shape of the cutting edge and enabling the cutter to be utilized throughout its entire length.

The shaft $c^2$ has its threaded end $c'$ screwed into the threaded part $c$, and to lock said shaft in operative position, so that it will be rotated by the hollow shaft, I insert in the said shaft B a locking device $d'$, represented as a rod having its inner end tapered to enter a correspondingly-tapered hole in the split end of the shaft $c^2$, said locking device expanding the split end of the shaft and firmly locking the same in place. The locking device has at its outer end an enlarged portion provided with a screw-thread $d^2$, which engages the screw-threads $d$, previously referred to, the extremity of the locking device having a slot, as 2, to be entered by a screw-driver to turn the locking device, and the shaft $c^2$ may have a suitable collar $c^{10}$ to be engaged by a wrench, if desired.

The head $A^3$ has a boss $A^{10}$, against the face of which is adjustably fastened by suitable bolts $e'$, having nuts $e^2$, the shank $e^3$ of the jack-guide, said bolts being extended through slots $e^4$ of said shank in order that the said jack-guide may be adjusted to occupy a position at a greater or less distance from the axis of the shaft B to provide for the required depth of concave to be cut in the breast of the heel. This guide has a tubular boss $e^5$ and has also a vertical groove $e^6$. (Shown best in Figs. 2 and 3 and by dotted lines in Fig. 1.) The boss receives a rod or shank $f$, forming part of a jack G, while the groove receives a guide-pin $f'$, extended from said rod, the pin preventing rotation of the rod during its sliding movement. The lower end of the rod $f$ has jointed to it in any suitable manner a connection $f^2$, the lower end of said connection being jointed at $f^3$ to one end of a treadle $f^4$, represented as pivotally mounted between stands $f^5$, erected upon the floor near the base A' of the column. The extent of upward movement of the rod $f$ is determined by a stop $f^6$ extended therefrom. Other suitable means than the foot-treadle shown may be employed to move the jack toward and from the cutter. The rod $f$ has a shoulder 3 near its upper end, as shown by full lines in Fig. 2 and by dotted lines in Fig. 3. The shoulder forms a rest upon which is supported the hub of the arm $g$ of the jack G. The said hub is recessed at one side to form a bolt-receiving opening tangential to the rod $f$ and to permit the head 4 of the bolt 5 to engage said rod. (See dotted lines in Fig. 3.) The bolt which is received in said recess is provided with a hand-nut $g'$, (shown in full lines in Fig. 2 and in dotted lines in Fig. 3,) by means of which the head of the bolt may be drawn against the rod $f$ to clamp the jack in position radially upon the said rod $f$. One end of the arm $g$ of the jack has extended upwardly from it an arm $g^2$, presenting, as herein shown, a horizontal shoulder $g^3$, a portion $g^4$ of said arm rising above said shoulder. The portion $g^4$ has connected with it, as by screws $5^\times$, (see Fig. 3,) a guard-plate $g^5$, having at its inner end a lip 6, (see Fig. $3^a$,) which lip constitutes a positioning device for the breast of the top lift 20. (Indicated in Fig. 9.) The lower side of the top lift and the heel rest, preferably, upon the shoulder $g^3$, as represented by the dotted lines $g^6$, Fig. 2, which line shows the position of a top lift on plate $g^5$. The edge of this lip 6 is in line with the axis of the rod $f$, so that as the jack G and heel-support $g^5$ are adjusted around the rod $f$ the angular position of the breast of the heel is changed, and consequently the angular position of the breast is determined with relation to the plane in which the cutter revolves, or, in other words, the change of position of the jack about the rod $f$ varies the action of the cutter on the heel-breast without changing the position of the edge of the lip 6. This arrangement permits of changing the depth of the cut without affecting at all the cut of the breast of the top lift. This is an important feature of my invention, as the top lift is already properly shaped before it is applied to the heel, and it is essential that its breast should not be cut at all. While this capacity for adjustment of the jack G and heel-support $g^5$ about the rod $f$ is very desirable and I prefer to embody it in my machine, it should nevertheless be understood that it is not indispensable and that a machine not having such capacity for adjustment, but in which the heel-support and lip 6 were so arranged that the cut in the breast would always be the same, would be within my invention. It is important, however, that the jack and lip be so arranged that if the jack is moved the breast edge of the top lift will be maintained throughout the entire cutting operation in a line substantially tangential to the circular path in which the knives of the cutter revolve.

To prevent any accidental tipping of the shoe upon or with relation to the plate $g^5$ during the trimming operation, I preferably provide the jack with a rest $g^7$ to position the sole of the shoe. Said rest is represented as having a round shank $g^8$, which enters the split end of the arm $g$, a suitable clamping-stud $g^9$, having a thumb-nut $g^{10}$, acting to clamp the shank of the rest in any position in which it may be adjusted on the arm $g$, the rest being made adjustable to adapt it to the curve of the shoe-sole.

The operator holding the shoe in his hand puts the top lift 20 of the heel 21 in contact with the plate $g^5$ and the sole 22 in contact with the rest $g^7$, as represented in Fig. 3, thus placing the face of the top lift and also the face of the breast of the heel to be trimmed each in acute angular position with relation to the longitudinal axis of the shaft carrying the cutter, this being done while the jack is in lowered position, and while holding the shoe firmly in position the operator by his foot on the treadle $f^4$ moves the rod $f$ vertically, causing (see Fig. 7) the breast 10 of the heel to be moved into the path of the blades of the primary cutter, which, cutting from one side of the heel to the other, removes a portion of the breast 10, as indicated by dotted lines, Fig. 7, leaving the breast concave, as shown in Fig. 8. The concave cut extends from the breast of the top lift substantially to the highest part of the shank of the sole, leaving a bottom line 8, which is in a plane substantially parallel with the plane of the top lift. Fig. 9 shows the heel-breast as it will be left by the action of the primary cutter, and viewing that figure it will be seen that there are portions 7 of the breast adjacent to the shank of the sole between the side edges and the central part of the shank, which portions were not cut away by the action of the primary cutter due to the convexity of the shank of the shoe. With the heel in the condition shown in Fig. 9 the operator removes the shoe from the jack and applies it in position with relation to the secondary cutter at the opposite end of the hollow shaft B. The secondary cutter is designed to remove the portions 7 referred to, the acting faces of said cutter and the guard $b^4$ forming an angle which permits the cutter to act on said portions 7 while the guard engages the shank of the sole. The shoe is presented to the secondary cutter with the shank of the sole pressed against the guard, so that as the cutter revolves its blades will remove the portions 7 on the breast of the heel adjacent to the shank between the side edges and the central part of the shank, the shoe being moved up and down until the portions 7 have been completely removed, leaving the breast of the heel concaved from one side to the other.

Having described my invention, what I claim as new, and desire to secure by Letters Patent, is—

1. In a heel-trimming machine, a cutter, a support for the shoe, having provision for varying the angular position of the breast of the heel with relation to the plane of movement of the cutter, and means for effecting a relative movement of said support and said cutter to cause the cutter to trim the breast of the heel from one side of the shoe to the other side.

2. In a machine for trimming the breasts of heels, a cutter arranged to trim the breast of the heel from one side of the heel to the other side, a support for a shoe and means for relatively adjusting said support and cutter to change the angular position of the breast of the heel with relation to the plane of movement of the cutter, whereby the depth of the cut may be varied.

3. In a heel-trimming machine, a cutter, a support for the shoe, means to adjust said support with relation to said cutter, and a guide for the breast of the top lift, said guide maintaining the breast of the top lift in substantially the same position with relation to the cutter in all positions to which the support may be adjusted.

4. In a heel-trimming machine, a cutter, a support for the heel, a lip on said support for positioning the breast of the top lift, and means for adjusting said support about an axis substantially coincident with the active face of said lip.

5. In a machine for trimming the breasts of heels, a shaft provided with a cutter, means to rotate said shaft and cutter to trim the breast of the heel, and a jack having a lip against which the front end of the top lift may be held during the trimming of the breast of the heel.

6. In a heel-trimming machine, a rotatable cutter, a jack having means to engage and position the breast of the heel, and means to change the relative positions of the jack and cutter in such manner that the breast of the heel may travel throughout the cutting operation in a line substantially tangent to the circle in which the blades of the cutter operate.

7. In a heel-trimming machine, a cutter, a jack having means to engage and position the breast of the heel with relation to the path of movement of the cutter, and means to adjust said jack toward or from the cutter to provide for cutting a cross-groove in the breast of the heel of any desired depth.

8. In a heel-trimming machine, a rotatable cutter, a jack having means to engage and position the breast of the heel, and means to move the jack that the breast of the heel may travel throughout the cutting operation in a line tangent to the circle in which the blades of the cutter operate, said jack being adjustable toward and from the cutter to provide for cutting a cross-groove in the breast of the heel of any desired depth.

9. In a heel-trimming machine, a rotatable cutter, a jack having means to engage and position the breast of the heel, said jack being adjustable about a center which is in a line tangential to the path of the blades of the cutter, and means for effecting a relative movement of said jack and cutter for causing the breast of the heel to travel throughout the cutting operation in a line substantially tangent to the circle in which the blades of the cutter operate.

10. In a heel-trimming machine, a rotatable cutter, a jack having means to engage and position the breast of the heel, said jack being adjustable about a center in a line substantially tangential to the path of the blades of the cutter, and means to adjust the jack toward or from the longitudinal axis of the cutter to provide for cutting a groove in the breast of the heel of any desired depth.

11. In a machine for trimming heels, a shaft having a rotatable cutter, a jack movable in a line tangential to the path of movement of the blades of said cutter, said jack having means to engage the breast and the tread of the top lift of a heel and present the breast of the heel in acute angular position with relation to the longitudinal axis of said cutter throughout the trimming operation.

12. In a heel-breasting machine, a cutter arranged to trim the breast of a heel from one side of the heel to its other side, in combination with a jack for sustaining the heel with its breast in acute angular position with relation to the plane of movement of said cutter.

13. In a machine of the class described, a shaft provided with a cutter, means to rotate said shaft, a jack having means to engage the breast of the top lift of the heel and maintain the breast of the heel in acute angular position with relation to the longitudinal axis of the shaft carrying the cutter throughout the trimming operation, and a rest for the fore part of the shoe.

14. In a machine of the class described, a shaft provided with a cutter, means to rotate said shaft, a jack having means to engage the breast of the top lift of the heel and maintain the breast of the heel in acute angular position with relation to the longitudinal axis of the shaft carrying the cutter throughout the trimming operation, and a rest for the fore part of the shoe, said rest being adjustable to provide for the curve of the sole of the shoe.

15. In a heel-trimming machine, a rotatable cutter for trimming the breast of a heel, a pivoted shoe-supporting jack arranged to be turned about its pivot to provide for changing the depth of the cut in the breast of the heel, and a lip on said jack for maintaining the breast-face of the top lift of the heel in a line tangential to the path of movement of the cutter in any position to which said jack may be adjusted.

16. In a machine of the class described, a shaft, a cutter mounted thereon adapted to trim from the breast of the heel of a shoe portions of said breast adjacent to the shank of the sole of the shoe between the side edges and the central part of the shank, and a rotatable guard for engaging the shank of the sole during the cutting operation, the acting faces of said cutter and said guard forming an angle which permits the cutter to act on said portions of the breast of the heel while the guard engages the shank of the sole.

17. In a machine of the class described, a shaft, a cutter mounted thereon adapted to trim from the breast of the heel of a shoe portions of said breast adjacent to the shank of the sole of the shoe between the side edges and the central part of the shank of said sole, said cutter being arranged to cut from one side of the breast to the other and being shaped according to the contour desired for the breast, and a guard arranged to engage the shank of the sole at a point adjacent to the part of the heel which is being operated upon by the cutter and shaped relatively to the cutter to permit the cutter to trim said portions of the breast while the guard engages the shank of the sole.

18. In a machine of the class described, a hollow shaft having interior screw-threads, a threaded and split cutter-carrying stem inserted in said shaft and engaging the screw-threads of the shaft, combined with a locking device entering said shaft from its opposite end and expanding said split stem to retain it in fixed position in said shaft, said locking device having a threaded portion engaging interior screw-threads of said hollow shaft.

19. In a machine for trimming the breasts of heels, a rod and a jack supported thereby, the jack being adjustable on the axis of the rod as a center, a lip on said jack for positioning the breast of the heel, the said lip being substantially in alinement with the center of the rod in different positions of the jack, whereby the cut made in the breast of the heel to concave it may always start uniformly with relation to the breast of the top lift.

In testimony whereof I have signed my name to this specification in the presence of two subscribing witnesses.

BENJAMIN F. MAYO.

Witnesses:
GEO. W. GREGORY,
EDITH M. STODDARD.

---

Correction in Letters Patent No. 784,340.

It is hereby certified that in Letters Patent No. 784,340, granted March 7, 1905, upon the application of Benjamin F. Mayo, of Salem, Massachusetts, for an improvement in "Heel-Trimming Machines," an error appears in the printed specification requiring correction, as follows: In line 76, page 3, the word "of" should read *at;* and that said Letters Patent should be read with this correction therein that the same may conform to the record of the case in the Patent Office.

Signed and sealed this 4th day of April, A. D., 1905.

[SEAL.]

F. I. ALLEN,
*Commissioner of Patents.*

13. In a machine of the class described, a shaft provided with a cutter, means to rotate said shaft, a jack having means to engage the breast of the top lift of the heel and maintain the breast of the heel in acute angular position with relation to the longitudinal axis of the shaft carrying the cutter throughout the trimming operation, and a rest for the fore part of the shoe.

14. In a machine of the class described, a shaft provided with a cutter, means to rotate said shaft, a jack having means to engage the breast of the top lift of the heel and maintain the breast of the heel in acute angular position with relation to the longitudinal axis of the shaft carrying the cutter throughout the trimming operation, and a rest for the fore part of the shoe, said rest being adjustable to provide for the curve of the sole of the shoe.

15. In a heel-trimming machine, a rotatable cutter for trimming the breast of a heel, a pivoted shoe-supporting jack arranged to be turned about its pivot to provide for changing the depth of the cut in the breast of the heel, and a lip on said jack for maintaining the breast-face of the top lift of the heel in a line tangential to the path of movement of the cutter in any position to which said jack may be adjusted.

16. In a machine of the class described, a shaft, a cutter mounted thereon adapted to trim from the breast of the heel of a shoe portions of said breast adjacent to the shank of the sole of the shoe between the side edges and the central part of the shank, and a rotatable guard for engaging the shank of the sole during the cutting operation, the acting faces of said cutter and said guard forming an angle which permits the cutter to act on said portions of the breast of the heel while the guard engages the shank of the sole.

17. In a machine of the class described, a shaft, a cutter mounted thereon adapted to trim from the breast of the heel of a shoe portions of said breast adjacent to the shank of the sole of the shoe between the side edges and the central part of the shank of said sole, said cutter being arranged to cut from one side of the breast to the other and being shaped according to the contour desired for the breast, and a guard arranged to engage the shank of the sole at a point adjacent to the part of the heel which is being operated upon by the cutter and shaped relatively to the cutter to permit the cutter to trim said portions of the breast while the guard engages the shank of the sole.

18. In a machine of the class described, a hollow shaft having interior screw-threads, a threaded and split cutter-carrying stem inserted in said shaft and engaging the screw-threads of the shaft, combined with a locking device entering said shaft from its opposite end and expanding said split stem to retain it in fixed position in said shaft, said locking device having a threaded portion engaging interior screw-threads of said hollow shaft.

19. In a machine for trimming the breasts of heels, a rod and a jack supported thereby, the jack being adjustable on the axis of the rod as a center, a lip on said jack for positioning the breast of the heel, the said lip being substantially in alinement with the center of the rod in different positions of the jack, whereby the cut made in the breast of the heel to concave it may always start uniformly with relation to the breast of the top lift.

In testimony whereof I have signed my name to this specification in the presence of two subscribing witnesses.

BENJAMIN F. MAYO.

Witnesses:
GEO. W. GREGORY,
EDITH M. STODDARD.

---

Correction in Letters Patent No. 784,340.

It is hereby certified that in Letters Patent No. 784,340, granted March 7, 1905, upon the application of Benjamin F. Mayo, of Salem, Massachusetts, for an improvement in "Heel-Trimming Machines," an error appears in the printed specification requiring correction, as follows: In line 76, page 3, the word "of" should read *at;* and that said Letters Patent should be read with this correction therein that the same may conform to the record of the case in the Patent Office.

Signed and sealed this 4th day of April, A. D., 1905.

[SEAL.]

F. I. ALLEN,
*Commissioner of Patents.*

Correction in Letters Patent No. 784,340.

It is hereby certified that in Letters Patent No. 784,340, granted March 7, 1905, upon the application of Benjamin F. Mayo, of Salem, Massachusetts, for an improvement in "Heel-Trimming Machines," an error appears in the printed specification requiring correction, as follows: In line 76, page 3, the word "of" should read *at;* and that said Letters Patent should be read with this correction therein that the same may conform to the record of the case in the Patent Office.

Signed and sealed this 4th day of April, A. D., 1905.

[SEAL.]

F. I. ALLEN,
*Commissioner of Patents.*